(12) United States Patent
Mishima et al.

(10) Patent No.: US 7,826,333 B2
(45) Date of Patent: Nov. 2, 2010

(54) OPTICAL RECORDING MEDIUM

(75) Inventors: Koji Mishima, Tokyo (JP); Daisuke Yoshitoku, Tokyo (JP); Takuya Tsukagoshi, Sagamihara (JP)

(73) Assignee: TDK Corporation, Tokyo (JP)

( * ) Notice: Subject to any disclaimer, the term of this patent is extended or adjusted under 35 U.S.C. 154(b) by 971 days.

(21) Appl. No.: 11/191,063

(22) Filed: Jul. 28, 2005

(65) Prior Publication Data

US 2006/0028971 A1 Feb. 9, 2006

(30) Foreign Application Priority Data

Aug. 3, 2004 (JP) .............................. 2004-227153

(51) Int. Cl.
| | |
|---|---|
| *G11B 7/20* | (2006.01) |
| *H04B 1/56* | (2006.01) |
| *H04B 3/40* | (2006.01) |
| *H04B 3/20* | (2006.01) |
| *H04L 5/14* | (2006.01) |

(52) U.S. Cl. ...................... 369/275.1; 369/94; 369/283; 369/286; 369/288

(58) Field of Classification Search ............... 369/275.1
See application file for complete search history.

(56) References Cited

U.S. PATENT DOCUMENTS

| 4,450,553 A * | 5/1984 | Holster et al. ............. 369/275.5 |
| 5,645,908 A * | 7/1997 | Shin .......................... 428/64.1 |
| 5,768,251 A * | 6/1998 | Ito et al. .................. 369/275.1 |
| 6,747,944 B2 * | 6/2004 | Higuchi ..................... 369/286 |
| 7,143,426 B2 * | 11/2006 | Mishima et al. ............. 720/718 |
| 7,357,969 B2 * | 4/2008 | Nakai et al. ................ 428/64.1 |

FOREIGN PATENT DOCUMENTS

| JP | A-2001-155380 | 6/2001 |
| JP | A-2003-338082 | 11/2003 |
| JP | A-2004-62976 | 2/2004 |
| JP | A-2004-213720 | 7/2004 |
| WO | WO 03/060895 A1 | 7/2003 |

OTHER PUBLICATIONS

Koji Mishima et al.; "Inorganic Write-Once Disc with Quadruple Recording Layers for Blu-ray Disc System"; *Proc. Of SPIE*; vol. 5069; pp. 90-97, 2003.
Noriyoshi Shida et al.; "The BD-Type Multi-Layer 100 GB ROM Disk using the Photopolymer Sheet"; *ISOM 2003 Technical Digest*; 2003; pp. 10-11.

* cited by examiner

*Primary Examiner*—Wayne R Young
*Assistant Examiner*—Carl Adams
(74) *Attorney, Agent, or Firm*—Oliff & Berridge, PLC

(57) ABSTRACT

An optical recording medium has a plurality of information layers which are placed between a substrate and an optically transparent cover layer with optically transparent spacer layers interposed between the information layers. From among the plurality of information layers, the information layer excluding the information layer arranged closest to the substrate and the information layer adjacent to the information layer closest to the substrate has asymmetrical reflection characteristics in which reflectance on the substrate side when light incident from the substrate side is reflected on the information layer toward the substrate side is lower than the reflectance on the cover layer side when light incident from the cover layer side is reflected on the information layer toward the cover layer side.

7 Claims, 4 Drawing Sheets

OPTICAL RECORDING MEDIUM

BACKGROUND OF THE INVENTION

1. Field of the Invention

The present invention relates to an optical recording medium comprising a plurality of information layers which are placed between a substrate and an optically transparent cover layer with optically transparent spacer layer interposed between the information layers.

2. Description of the Related Art

Optical recording media, such as CDs (Compact Disc) and DVDs (Digital Versatile Disc), have been widely utilized as information recording media. Furthermore, in recent years optical recording media with even higher densities that can record large quantities of information by means of using blue or blue-violet laser light as the irradiation light have been gathering attention. Moreover, these optical recording media can increase the recording capacity to that extent by providing a configuration comprising a plurality of information layers which are placed between a substrate and an optically transparent cover layer with optically transparent spacer layer interposed between the information layers (for example, see Japanese Patent Laid-Open Publication No. 2003-338082).

There were trends, however, in which the exactness of reproduction of the data on the optical recording medium became low due to this type of configuration comprising a plurality of information layers.

SUMMARY OF THE INVENTION

In view of the foregoing problem, various exemplary embodiments of this invention provide an optical recording medium comprising a plurality of information layers from which data can be reliably reproduced.

The present invention achieves this object by providing a configuration wherein at least one information layer from among a plurality of information layers excluding the information layer arranged closest to a substrate and the information layer adjacent to the above information closest to the substrate layer have asymmetrical reflection characteristics in which reflectance on the substrate side when light incident from the substrate side is reflected on the information layer toward the substrate side is lower than the reflectance on a cover layer side when light incident from the cover layer side is reflected on the information layer toward the cover layer side.

Upon diligent investigations through processes which lead to the conception of the present invention, the inventors ascertained that reductions in the exactness of reproduction of data on an optical recording medium was mainly due to the interference of reflected light other than the regular reflected light for reproduction. In other words, the laser light for reproduction that is irradiated onto the optical recording medium is not only reflected on the information layer of the reproduction target but one portion of that light is also reflected in various states between multiple information layers and interferes with the regular reflected light for reproduction that is reflected on the information layer of the reproduction target. In particular, if the lengths of the regular light path of the laser light for reproduction that is reflected on the information layer of the reproduction target only one time and another light path of the laser light in another reflection state coincide with each other within the optical recording medium, the effect of the interference will become larger. On the other hand, because the thickness of each layer of the optical recording medium has microscopic variations in the circumferential direction, the position where the effect of the interference is large and the position where the effect of the interference is small in the circumferential direction become intermixed. Consequently, it is thought that variations in the reflectance become larger each time around and the exactness of reproduction of the data is reduced.

In contrast to the regular reflected light for reproduction being incident from the cover layer side on the information layer of the reproduction target and then reflected toward the cover layer side one time only as described above, other reflected light that interferes with this light is reflected multiple times between multiple information layers and is always incident from the substrate side on any of the information layers and is then reflected toward the substrate side at least one time. Therefore, by making the reflectance of the information layer on the substrate side lower than the reflectance of the information layer on the cover layer side, quantity of other reflected light that interferes with the regular reflected light for reproduction is reduced. Consequently, the exactness of reproduction of the data can be improved.

Accordingly, various exemplary embodiments of this invention provide an optical recording medium comprising a substrate, an optically transparent cover layer, and at least three information layers which are placed between the substrate and the cover layer with optically transparent spacer layer interposed between the information layers, wherein at least one information layer from among the information layers excluding an information layer arranged closest to the substrate and an information layer adjacent to the information layer closest to the substrate has asymmetrical reflection characteristics in which reflectance on the substrate side when light incident from the substrate side is reflected on the information layer toward the substrate side is lower than the reflectance on the cover layer side when light incident from the cover layer side is reflected on the information layer toward the cover layer side.

DETAILED DESCRIPTION OF THE PREFERRED EMBODIMENT

Various exemplary embodiments of this invention will be hereinafter described in detail with reference to the drawings.

Figure 1:
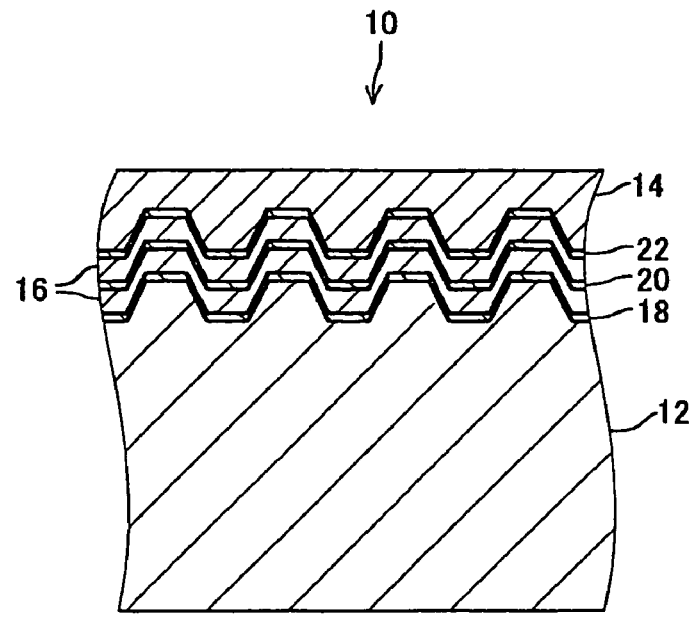
FIG. 1 is a schematic cross-sectional side view showing the structure of an optical recording medium according to a first exemplary embodiment of the present invention.

An optical recording medium 10 according to a first exemplary embodiment of the present invention has an outside diameter of 120 mm and a circular disk shape with a thickness of approximately 1.2 mm. As shown in FIG. 1, the optical recording medium 10 is provided with three information layers 18, 20, and 22. These information layers 18, 20, and 22 are placed between a substrate 12 and an optically transparent cover layer 14 with optically transparent spacer layers 16 interposed therebetween. From among the three information layers 18, 20, and 22, the information layer 22 arranged closest to the cover layer 14 has asymmetrical reflection characteristics in which reflectance on the substrate 12 side when light incident from the substrate 12 side is reflected on the information layer 22 toward the substrate 12 side is lower than the reflectance on the cover layer 14 side when light incident from the cover layer 14 side is reflected on the information layer 22 toward the cover layer 14 side. Descriptions of other configurations identical to a conventional optical recording medium or similar to a conventional optical recording medium have been suitably omitted because they are not considered to be especially important to understand the present invention.

The substrate 12 is approximately 1.1 mm thick and is formed in a concavo-convex pattern that comprises pits or grooves on the surface of the cover layer 14 side. Pits are formed when the optical recording medium 10 is a ROM (Read Only Memory) type and grooves are formed when the optical recording medium 10 is an R (Recordable) or RW (Rewritable) type. Although the terms "groove" and "pit" are normally used with a meaning of a concave portion used to recording/reproducing data, for convenience sake, the terms "groove" and "pit" are used even for regions used to recording/reproducing data which are convex portions protruding toward the cover layer 14 side in this application. In this exemplary embodiment, the convex portions protruding toward the cover layer 14 side are grooves or pits. Examples of the materials used for the substrate 12 include polycarbonate resins, acrylic resins, epoxy resins, polystyrene resins, polyethylene resins, polypropylene resins, silicone resins, fluorine-containing resins, ABS resins, and urethane resins.

The cover layer 14 is approximately 100 μm thick. Examples of the materials used for the cover layer 14 include energy ray curable resins such as optically transparent acrylic type UV curable resins and epoxy type UV curable resins. Here, the term "energy ray" has properties which harden a specific resin in a flow state. For example, it is used to define general terms for electromagnetic waves and particle beams such as ultraviolet rays and electron beams. An optically transparent film can also be used for the material of the cover layer 14.

The spacer layer 16 is, for example, approximately 10 to 90 μm thick and is formed in a concavo-convex pattern with pits or grooves on both the surfaces as the substrate 12. In like manner to the cover layer 14, examples of the materials used for the spacer layer 16 include energy ray curable resins such as optically transparent acrylic type UV curable resins and epoxy type UV curable resins.

The information layer 18 is formed in a concavo-convex pattern following the concavo-convex pattern of the substrate 12. Further, the information layer 20 is also formed in a concavo-convex pattern following the concavo-convex pattern of the spacer layer 16 on the substrate 12 side.

The information layers 18 and 20 include at least a recording layer although the configuration differs depending on the format, i.e. ROM type, R type, and RW type.

In case of a ROM type, the surfaces in the concavo-convex patterns of the substrate 12 and the spacer layers 16 on the cover layer 14 side correspond to recording layers and reflective layers are formed on the recording layers. Al, Ag, Au, Cu, Mg, Ti, Cr, Fe, Co, Ni, Zn, Ge, Ag, or Pt can be used as a material for the reflective layer. From among these materials Al, Ag, Au, and Cu are preferred because they can obtain a high reflectance. A dielectric material can also be used as a material for the reflective layer.

In case of an R type, recording layers made of an organic coloring material or inorganic material are formed following the concavo-convex patterns of the surfaces of the substrate 12 and the spacer layers 16 on the cover layer 14 side and reflective layers or dielectric layers are formed on one surface or both surfaces of the recording layer as necessary. Examples of the material that can be used as the main constituent for the dielectric layer include oxides such as $SiO_2$, $Al_2O_3$, ZnO, $CeO_2$, and $Ta_2O_5$, nitrides such as SiN, AlN, GeN, GeCrN, and a sulfide such as ZnS, and a combination of these. In addition, materials identical to the reflective layer of the ROM type mentioned above can also be used as a material for the reflective layer.

In an RW type, recording layers made of a phase change material are formed following the concavo-convex patterns of the surfaces of the substrate 12 and the spacer layers 16 on the cover layer 14 side and reflective layers or dielectric layers are formed on one surface or both surfaces of the recording layer as necessary. In addition, materials identical to the reflective layer and dielectric layer of the ROM type and the R type mentioned above can also be used as a material for the reflective layer and dielectric layer.

Figure 2:
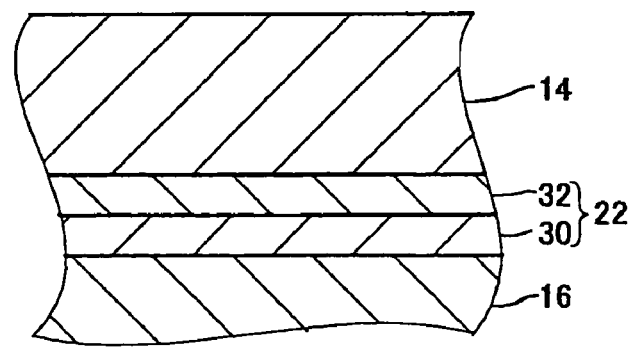
FIG. 2 is an enlarged cross-sectional side view showing the configuration of the information layers of this optical recording medium.

The information layer 22 has a different configuration depending on the format of ROM type, R type, and RW type as the information layers 18 and 20. The information layer 22 provide a recording layer applicable to each format. As shown in the enlarged view of FIG. 2, the information layer 22 is composed of two layers with different optical absorbances.

From among these two layers it is preferable for the optical absorbance of the layer 30 arranged on the substrate 12 side to be relatively low and the optical absorbance of the layer 32 arranged on the cover layer 14 side to be relatively high. Both or one of these two layers 30 and 32 can serve as a reflective layer for a ROM type and for an R type and RW type can serve as a recording layer, a dielectric layer, and a reflective layer or the like at the same time. It is also preferable for the reflectance on the substrate side of the information layer 22 to be equal to or less than 90% of the reflectance on the cover layer side.

Next, the operation of optical recording medium 10 will be described.

When laser light for reproduction is irradiated onto the optical recording medium 10, not only is the laser light for reproduction irradiated onto the optical recording medium reflected on the information layer of the reproduction target but one portion of that light is also reflected in various states between multiple information layers and interferes with the regular reflected light for reproduction that is reflected on the information layer of the reproduction target.

In an optical recording medium which has three information layers 18, 20, and 22 as the optical recording medium 10, when the data of the information layer 18 arranged closest to the substrate 12 is reproduced, the length of the regular light path of the laser light for reproduction reflected only one time on the information layer 18 of the reproduction target and the length of the other light path of the laser light in the other reflective state almost coincide to make it easy for the effect of the interference to become larger. If the lengths of the light paths coincide, not only will the focal point of the laser light for reproduction in the regular reflective state be caught by a reproduction detector but the focal point of the other portion of the laser light in the other reflective state will also be caught by the detector. Consequently, the effect of the interference can easily become larger.

Figure 3:
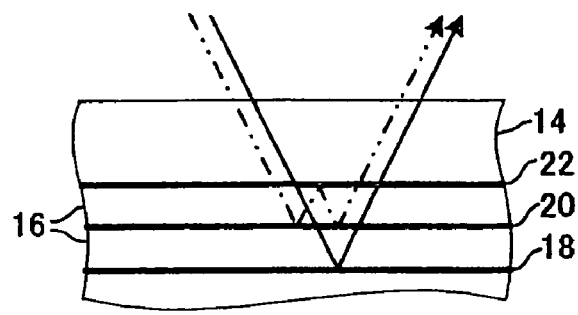
FIG. 3 is a schematic cross-sectional side view showing an example of a reflection state of laser light for reproduction in this optical recording medium.

In more detail, as shown by the solid line in FIG. 3, the regular light path of the laser light for reproduction is incident from the cover layer 14 side on the information layer 18 of the reproduction target and is reflected only one time on the information layer 18 toward the cover layer 14 side. In contrast, as shown by the dotted lines in FIG. 3, another portion of the laser light in another reflective state of which light path almost coincides with the regular light path of the laser light is incident from the cover layer 14 side on the information layer 20 and is reflected toward the cover layer 14 side. Then, it is incident from the substrate 12 side on the information layer 22 and is reflected on the information layer 22 toward the substrate 12 side. It is then incident from the cover layer 14 side onto the information layer 20 again and reflected thereon toward the cover layer 14 side. Here, the information layer 22 has asymmetrical reflection characteristics in which reflectance on the substrate side when light incident from the substrate 12 side is reflected on the information layer 22 toward the substrate 12 side is lower than the reflectance on the cover layer side when light incident from the cover layer 14 is reflected on the information layer 22 toward the cover layer 14 side. Consequently, when the light is reflected on the information layer 22 from among these three reflections, the quantity of light is reduced. In other words, the quantity of the other reflected light that interferes with the regular reflected light for reproduction is reduced and this improves the exactness of reproduction of the data even more.

Next, a second exemplary embodiment of the present invention will be described.

Figure 4:
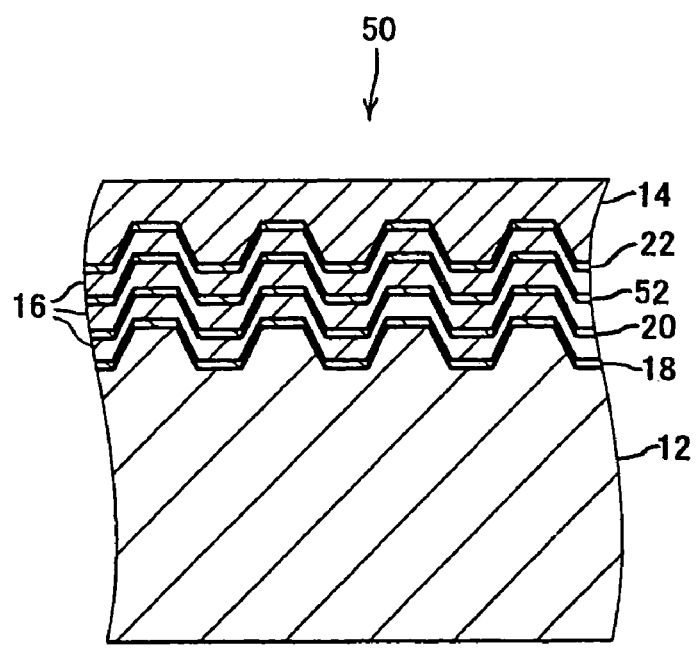
FIG. 4 is a schematic cross-sectional side view showing the structure of an optical recording medium according to a second exemplary embodiment of the present invention.
Figure 5:
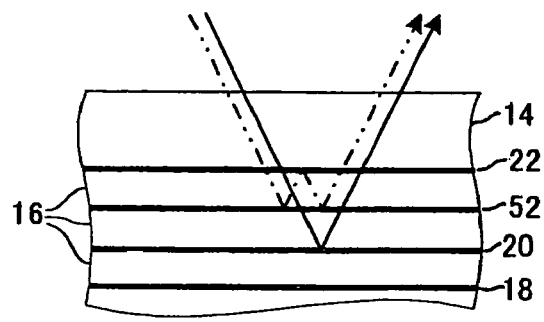
FIG. 5 is a schematic cross-sectional side view showing an example of a reflection state of laser light or reproduction in this optical recording medium.
Figure 6:
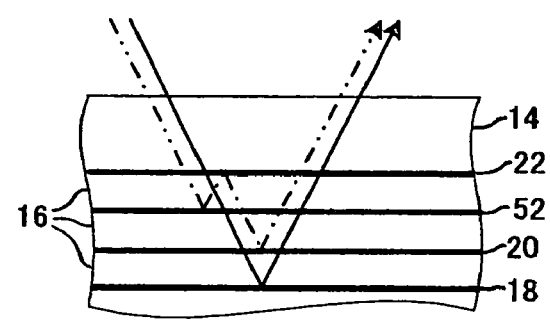
FIG. 6 is a schematic cross-sectional side view showing another example of a reflection state of laser light for reproduction in this optical recording medium.
Figure 7:
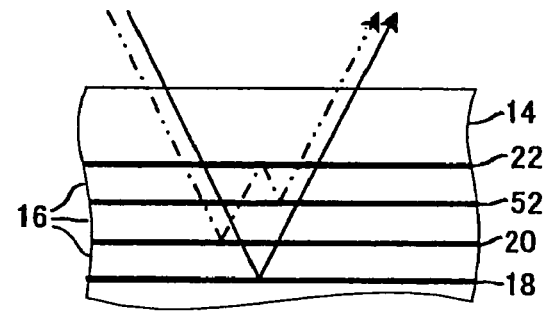
FIG. 7 is a schematic cross-sectional side view showing still another example of a reflection state of laser light for reproduction in this optical recording medium.
Figure 8:
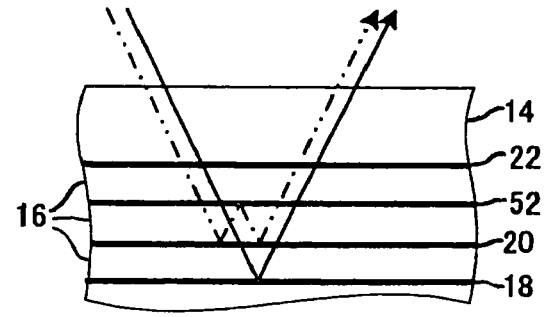
FIG. 8 is a schematic cross-sectional side view showing still another example of a reflection state of laser light for reproduction in this optical recording medium.

As shown in FIG. 4, compared to the optical recording medium 10 according to the first exemplary embodiment, an optical recording medium 50 according to this second exemplary embodiment has an information layer 52 further formed between the information layer 22 and the information layer 20. The information layer 52 has the similar configuration to that of the information layer 22 with asymmetrical reflection characteristics in which reflectance on the substrate side when light incident from the substrate 12 side is reflected toward the substrate 12 side is lower than the reflectance on the cover layer side when light incident from the cover layer 14 side is reflected toward this cover layer 14 side. Further, spacer layers 16 (three layers total) are provided between the information layers 22 and 52, between the information layer 52 and 20, and between the information layers 20 and 18, respectively. Since the other configurations are the same as the optical recording medium 10, the same reference numerals are assigned as those in FIG. 1 and FIG. 2, and descriptions therefor are omitted.

In an optical recording medium which has four information layers 18, 20, 52, and 22 as the optical recording medium 50, when the data of the information layer 18 arranged closest to the substrate 12 or the information layer 20 adjacent to the information layer 18 are reproduced, the regular light path of the laser light for reproduction reflected only one time on the information layer 18 or 20 of the reproduction target and another light path of another portion of the laser light in another reflective state almost coincide with each other, thereby making it easy for the effect of the interference to become larger. In more detail, as shown by the solid lines in FIG. 5 to FIG. 8, the regular laser light for reproduction is incident from the cover layer 14 side on the information layer 18 or 20 of the reproduction target of the data and is reflected only one time on the information layer 18 or 20 toward the cover layer 14 side. In contrast, the laser light in another reflective state, as shown by the dotted lines in these figures, whose lengths of light path almost coincide with that of the regular light path of the laser light for reproduction is reflected multiple times within the optical recording medium 50 and then one time from among these multiple reflections is incident from the substrate 12 side on the information layer 22 or 52 and is reflected thereon toward the substrate 12 side. Here, the information layer 22 or 52 has asymmetrical reflection characteristics in which reflectance on the substrate side when light incident from the substrate 12 side is reflected on the information layer 22 or 52 toward the substrate 12 side is lower than the reflectance on the cover layer side when light incident from the cover layer 14 side is reflected on the information layer 22 or 52 toward the cover layer 14 side. Consequently, when the light is reflected on the information layer 22 or 52, the quantity of light is reduced. In other words, the quantity of reflected light that interferes with the regular reflected light for reproduction is reduced and the exactness of reproduction of the data is improved even more.

The information layers 22 and 52 which have asymmetrical reflection characteristics in the first exemplary embodiment and the second exemplary embodiment each comprise two layers with different optical absorbances. There is, however, not special limitation on the configuration of the information layers 22 and 52 if the asymmetrical reflection characteristics can be imparted thereto. For example, a configuration in which three or more layers with different optical absorbances are arranged asymmetrically in the direction of thickness can be used and a configuration in which other multiple layers with different optical characteristics are arranged asymmetrically in the direction of thickness can also be used. In addition, a configuration that has a single layer with asymmetrical reflection characteristics can also be used.

As a more concrete example, it is possible to form one or a plurality of layers on the substrate 12 side and/or cover layer 14 side of the recording layer that constitutes one portion of the information layer 22 or 52 and regulate the reflectance by adjusting the structure, composition, and thickness of these layers such that the reflectance on the substrate side is lower than the reflectance on the cover layer side. It is also possible to form the recording layer itself from two layers and regulate the reflectance by adjusting the structure, composition, and thickness of each recording layer such that the reflectance on the substrate side is lower than the reflectance on the cover layer side. In case of the ROM type as another example, by means of using reactive sputtering, with oxygen and nitrogen as the reactive gas, to deposit one reflective layer along with regulating the concentration of the reactive gas, the composition of one side of the reflective layer can be regulated such that the reflectance on the substrate side is lower than the reflectance on the cover layer side.

Although the optical recording medium 10 in the first exemplary embodiment comprises three information layers and the optical recording medium 50 in the second exemplary embodiment comprises four information layers, the present invention is also suitable for optical recording media comprising five or more information layers.

Although the information layer 22 arranged closest to the cover layer 14 and the information layer 52 adjacent to this information layer 22 of the optical recording medium 50 in the second exemplary embodiment have asymmetrical reflection characteristics, optical recording media can also be one in which only one of the information layers 22 and 52 has asymmetrical reflection characteristics depending on the state of the interference of the reflected light which is causing the problem. When the optical recording media have five or more information layers, information layers can also be suitably arranged which have asymmetrical reflection characteristics depending on the state of the interference of the reflected light which is causing the problem in the similar manner to the above cases.

Further, although only the information layers 22 and 52 of the optical recording media 10 and 50 in the first and second exemplary embodiments have asymmetrical reflection characteristics, the information layer 20 many have asymmetrical reflection characteristics. For this case, some effect can be obtained to reduce the light quantity of other reflected light that interferes with the regular reflected light for reproduction. Even further, the information layer 18 can have asymmetrical reflection characteristics.

Incidentally, the laser light whose light path is different from the regular one of the laser light for reproduction and whose light path length coincides with that of the regular light path can interfere with the regular reflected light for reproduction when the optical recording medium has three or more information layers. The information layer where laser light that interferes with the regular laser light for reproduction is incident from the substrate side in that light path and is reflected toward the substrate side includes an information layer excluding the information layer arranged closest to the substrate and the information layer adjacent to this closest information layer. There are many types of this sort of interference condition as shown FIG. 3 to FIG. 8 and although a plurality of light path of the laser light that causes the interference exist, many of these interference conditions include a reflection state in which laser light that interferes with the regular laser light for reproduction is incident from the substrate side on the information layer arranged closest to the cover layer and is then reflected toward the substrate side. Consequently, it is preferable for the information layer arranged closest to the cover layer to have the asymmetrical reflection characteristics in which reflectance on the substrate side is lower than the reflectance on the cover layer side.

Although the optical recording media 10 and 50 in the first and second exemplary embodiments are a single-sided recording type provided with an information layer on one side only, the present invention can of course be applied to an optical recording medium of a double-sided recording type provided with an information layer on both sides as well.

In addition, although the optical recording media 10 and 50 in the first and second exemplary embodiments have pits or grooves in a convex shape as seen from the cover layer 14, the present invention can of course be applied to an optical recording medium that has pits or grooves in a concave shape as seen from the cover layer 14 as well.

Even further, although the optical recording media 10 and 50 in the first and second exemplary embodiments have the configuration in which the cover layer 14 is thinner than the substrate 12, the present invention can of course be applied to an optical recording medium, such as a DVD, with a substrate and a cover layer having equal thicknesses. For this case, although the shapes of the substrate and the cover layer are almost equal to each other, the one to which the laser light for recording/reproduction is irradiated is called the cover layer in this application.

WORKING EXAMPLE 1

Three optical recording media A, B, C were produced. These optical recording media were R-type with three recording layers and had configurations equal to optical recording medium 10 of the first exemplary embodiment. These three optical recording media A, B, and C each had the mutually different configuration of the information layer 22. The configuration, with the exception of the information layer 22, was equal.

In more detail, the information layer 22 of the optical recording medium A comprises a recording layer of $Zn_{20}Si_{10}Mg_{25}O_{20}S_{25}$ (mole ratio) material and a dielectric layer of $ZnSSiO_2$ material arranged on the cover layer 14 side of this recording layer. The thickness of the recording layer was approximately 18 nm and the thickness of the dielectric layer was approximately 60 nm.

Further, the information layer 22 of the optical recording medium B comprises a recording layer of $Zn_{20}Si_{10}Mg_{25}O_{20}S_{25}$ material and a dielectric layer of $Al_2O_3$ material arranged on the cover layer 14 side of this recording layer. The thickness of the recording layer was approximately 18 nm and the thickness of the dielectric layer was approximately 58 nm.

Even further, the information layer 22 of the optical recording medium C comprises a recording layer of $Zn_{20}Si_{10}Mg_{25}O_{20}S_{25}$ material and dielectric layer of ZnS-$SiO_2$ material arranged on the substrate 12 side of this recording layer. The thickness of the recording layer was approximately 18 nm and the thickness of the dielectric layer was approximately 96 nm.

When the thickness is 18 nm, the optical absorbance of $Zn_{20}Si_{10}Mg_{25}O_{20}S_{25}$ is approximately 17%. When the thickness is 60 nm, the optical absorbance of $ZnSSiO_2$ is approximately 0%. When the thickness is 58 nm, the optical absorbance of $Al_2O_3$ is approximately 0%.

Table 1 shows a comparison of information layers 18, 20, 22 of these three types of optical recording media A, B, C and spacer layer 16.

| Wavelength: | 405 nm |
|---|---|
| Numerical aperture: | 0.85 |
| Reproduction power: | 0.7 mW |

COMPARATIVE EXAMPLE 1

Compared to Working Example 1 above, two types of optical recording media D and E with different configurations of the information layer 22 were produced.

In more concrete terms, the information layer 22 of the optical recording medium D comprises only a recording layer of $Zn_{20}Si_{10}Mg_{25}O_{20}S_{25}$ material. The thickness of the recording layer was approximately 18 nm.

The information layer 22 of the optical recording medium E comprises a recording layer of $Zn_{20}Si_{10}Mg_{25}O_{20}S_{25}$ material and a recording layer of $ZnSSiO_2$ material arranged on the substrate 12 side of this recording layer. The thickness of the recording layer was approximately 18 nm.

TABLE 1

| | | | Optical recording medium | | | | |
|---|---|---|---|---|---|---|---|
| | | | A | B | C | D | E |
| Information layer 22 | Dielectric layer | Material | — | — | ZnS•$SiO_2$ | — | ZnS•$SiO_2$ |
| | | Thickness(nm) | — | — | 96 | — | 36 |
| | Recording layer | Material | | | ZnSiMgOS | | |
| | | Thickness(nm) | | | 18 | | |
| | Dielectric layer | Material | ZnS•$SiO_2$ | $Al_2O_3$ | — | — | — |
| | | Thickness(nm) | 60 | 58 | — | — | — |
| Spacer layer 16 | | Material | | | Acrylic UV curable resin | | |
| | | Thickness(μm) | | | 20 | | |
| Information layer 20 | Recording layer | Material | | | ZnSiMgOS | | |
| | | Thickness(nm) | | | 18 | | |
| Spacer layer 16 | | Material | | | Acrylic UV curable resin | | |
| | | Thickness(μm) | | | 20 | | |
| Information layer 18 | Recording layer | Material | | | ZnSiMgOS | | |
| | | Thickness(nm) | | | 18 | | |
| Reflectance on the cover layer side of the information layer 22 | | | 4.1 | 4.1 | 4.0 | 4.0 | 3.9 |
| Reflectance on the substrate side of the information layer 22 | | | 1.5 | 2.5 | 3.6 | 4.0 | 8.5 |
| Variations in the reflectance of the information layer 18 (%) | | | 7 | 10 | 14 | 17 | 25 |

The reflectance on the cover layer side of the information layer 22, the reflectance on the substrate side thereof, and variations in the reflectance on the cover layer side of the information layer 18 for the laser light for reproducing data of the information layer 18 were measured for these three types of the optical recording media A, B, and C. The variation in the reflectance is a value obtained by dividing the difference between the maximum value and minimum value of the reflectance in a single turn by the maximum value of the reflectance. Table 1 shows the measurement results. An optical recording medium evaluation device DDU1000 (Pulstec Industries Inc.) was used for measurement. The specifications for the irradiated laser light in the measurement are shown below.

Table 1 shows the respective configurations of the information layers 18, 20, and 22 and the spacer layers 16 of these two types of the optical recording media D and E.

The reflectance on the cover layer side and the reflectance on the substrate side of the information layer 22 and variations in the reflectance of the information layer 18 for the laser light for reproducing data of the information layer 18 were also measured. Table 1 also shows these results.

As shown in Table 1, the reflectance on the substrate side was lower than the reflectance on the cover layer side for any of the optical recording media A, B, and C of Working Example 1. In contrast to this, the reflectance on the cover layer side and the reflectance on the substrate side for the optical recording medium D of Comparative Example 1 were equal to each other. The reflectance on the substrate side was higher than the reflectance on the cover layer side for the optical recording medium E of Comparative Example 1.

Figure 9:
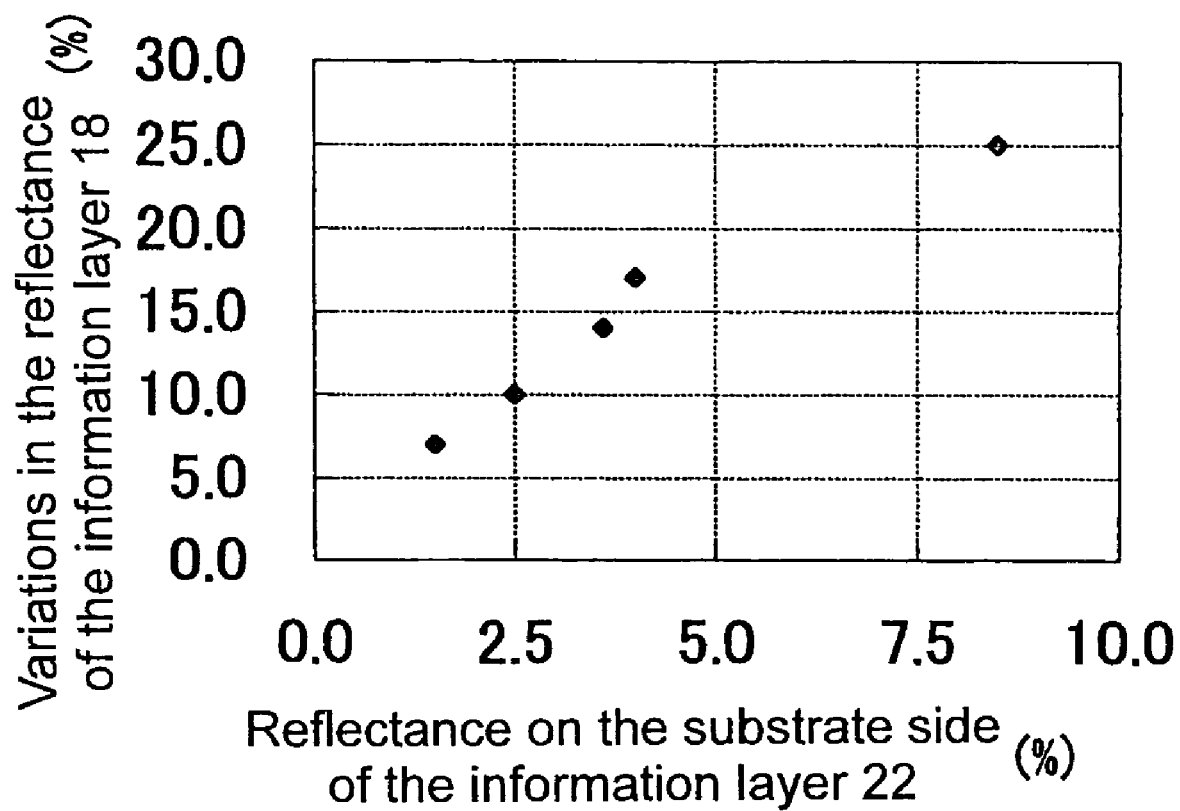
FIG. 9 is a graph showing the relationship between the reflectance on the cover layer side and variations in the reflectance in optical recording media according to Working Example 1 and Comparative Example 1.

FIG. 9 is a graph showing the relationship between the reflectance on the substrate side of the information layer 22 of the optical recording media A, B, C, D, and E and variations in the reflectance of the information layer 18 for the laser light for reproducing data of the information layer 18. From FIG. 9 it is understood there is a tendency for variations in the reflectance of the information layer 18 for the laser light for reproducing data of the information layer 18 to become smaller as the reflectance on the substrate side of the information layer 22 becomes lower.

When using a DVD or an optical recording medium that utilizes blue or blue-violet laser light as the irradiation light, variations in the reflectance are required by standards to be restricted to within 15%. The variations in the reflectance for any of the optical recording media A, B, and C of Working Example 1 are within 15% satisfying this requirement. In contrast to this, variations in the reflectance for both the optical recording media D and E of Comparative Example 1 exceeded 15%.

The optical recording medium C, with variations in the reflectance of 14%, had a reflectance on the substrate side is 90% that of the reflectance on the cover layer side. In other words, it is understood that if the information layer 22 is configured such that the reflectance on the substrate side is equal to or less than 90% of the reflectance on the cover layer side, variations in the reflectance can be reliably restricted to 15% or less.

WORKING EXAMPLE 2

An optical recording medium F was produced. This optical recording medium F was a ROM type with three recording layers and has a configuration equal to the optical recording medium 10 of the first exemplary embodiment.

In more concrete terms, the information layer 22 of the optical recording medium F comprises a reflective layer formed from Al material deposited on the concavo-convex pattern of the substrate 12 and a dielectric layer of ZnSSiO$_2$ material arranged on the cover layer 14 side of this reflective layer. The thickness of the reflective layer was approximately 2.5 μm. The optical absorbance of Al is approximately 15%. Table 2 shows the configurations of the information layers 18, 20, and 22 and the spacer layer 16 of the optical recording layer F.

TABLE 2

|  |  |  | Optical recording medium | |
|---|---|---|---|---|
|  |  |  | F | G |
| Information layer 22 | Reflective layer | Material | Al | |
|  |  | Thickness(nm) | 2.5 | |
|  | Dielectric layer | Material | ZnS•SiO$_2$ | — |
|  |  | Thickness(nm) | 32 | — |
| Spacer layer 16 |  | Material | Acrylic UV curable resin | |
|  |  | Thickness(nm) | 20 | |
| Information layer 20 | Reflective layer | Material | ZnS•SiO$_2$ | |
|  |  | Thickness(nm) | 26 | |

TABLE 2-continued

|  |  |  | Optical recording medium | |
|---|---|---|---|---|
|  |  |  | F | G |
| Spacer layer 16 |  | Material | Acrylic UV curable resin | |
|  |  | Thickness(nm) | 20 | |
| Information layer 18 | Reflective layer | Material | ZnS•SiO$_2$ | |
|  |  | Thickness(nm) | 28 | |
| Reflectance on the cover layer side of the information layer 22 |  |  | 4.2 | 4.3 |
| Reflectance on the substrate side of the information layer 22 |  |  | 2.0 | 4.3 |
| Variations in the reflectance of the information layer 18 (%) |  |  | 9 | 16 |

The reflectance on the cover layer side, the reflectance on the substrate side of the information layer 22 of the optical recording medium F, and variations in the reflectance of the information layer 18 for the laser light for reproducing data of the information layer 18 were measured. These results are shown in Table 2.

COMPARATIVE EXAMPLE 2

An optical recording medium G was produced with a different configuration for the information layer 22 compared to Working Example 2 above. In more detail, the information layer 22 of the optical recording medium G only comprises a reflective layer formed of Al material.

The configuration of the information layers 18, 20, and 22 of the optical recording medium G and the spacer layer 16 thereof are shown in Table 2. The reflectance on the cover layer, the reflectance on the substrate of the information layer 22, and variations in the reflectance of the laser light for reproducing data of information layer 18 were measured for optical recording medium G. Those results are also shown in Table 2.

As shown in Table 2, the reflectance on the substrate side was lower than the reflectance on the cover layer side for the optical recording medium F of Working Example 2. In contrast to this, the reflectance on the cover layer side and the reflectance on the substrate side were equal for the optical recording medium G of Comparative Example 2.

Further, variations in the reflectance were within 15% for the optical recording medium F of Working Example 2 which satisfied the requirements of the standards. In contrast to this, variations in the reflectance exceeded 15% for the optical recording medium G of Comparative Example 2.

In this manner, it was confirmed that variations in the reflectance could be suppressed within a desired range regardless of whether the format is an R type or a ROM type by making the reflectance on the substrate side of an information layer lower than the reflectance on the cover layer side of the information layer.

The present invention can be utilized in an optical recording medium with a plurality of information layers.

What is claimed is:
1. An optical recording medium comprising:
a substrate,
an optically transparent cover layer on which a laser light is incident from outside, and at least three information layers which are placed between the substrate and the cover layer with an optically transparent spacer layer interposed between the information layers, wherein at least one information layer from among the information layers, excluding an information layer arranged closest to the substrate and an information layer adjacent to the information layer arranged closest to the substrate, has asymmetrical reflection characteristics in which reflectance on the substrate side when light incident from the substrate side is reflected on the information layer toward the substrate side is lower than the reflectance on the cover layer side when light incident from the cover layer side is reflected on the information layer toward the cover layer side, and the reflectance on the substrate side of the information layer having the asymmetrical reflection characteristics is equal to or less than 90% of the reflectance on the cover layer side.

2. The optical recording medium according to claim 1, wherein
at least an information layer arranged closest to the cover layer from among the plurality of information layers has the asymmetrical reflection characteristics.

3. The optical recording medium according to claim 2, wherein
the reflectance on the substrate side of the information layer having the asymmetrical reflection characteristics is equal to or less than 90% of the reflectance on the cover layer side.

4. The optical recording medium according to claim 3, wherein
the information layer having the asymmetrical reflection characteristics includes two layers with different optical absorbances, one layer with a relatively low optical absorbance being placed on the substrate side and the other layer with a relatively high optical absorbance being placed on the cover layer side.

5. The optical recording medium according to claim 2, wherein
the information layer having the asymmetrical reflection characteristics includes two layers with different optical absorbances, one layer with a relatively low optical absorbance being placed on the substrate side and the other layer with a relatively high optical absorbance being placed on the cover layer side.

6. The optical recording medium according to claim 1, wherein
the information layer having the asymmetrical reflection characteristics includes two layers with different optical absorbances, one layer with a relatively low optical absorbance being placed on the substrate side and the other layer with a relatively high optical absorbance being placed on the cover layer side.

7. The optical recording medium according to claim 1, wherein
the information layer having the asymmetrical reflection characteristics includes two layers with different optical absorbances, one layer with a relatively low optical absorbance being placed on the substrate side and the other layer with a relatively high optical absorbance being placed on the cover layer side.

* * * * *